A. C. RAND.
Gas-Machines.
No. 150,078.  Patented April 21, 1874.
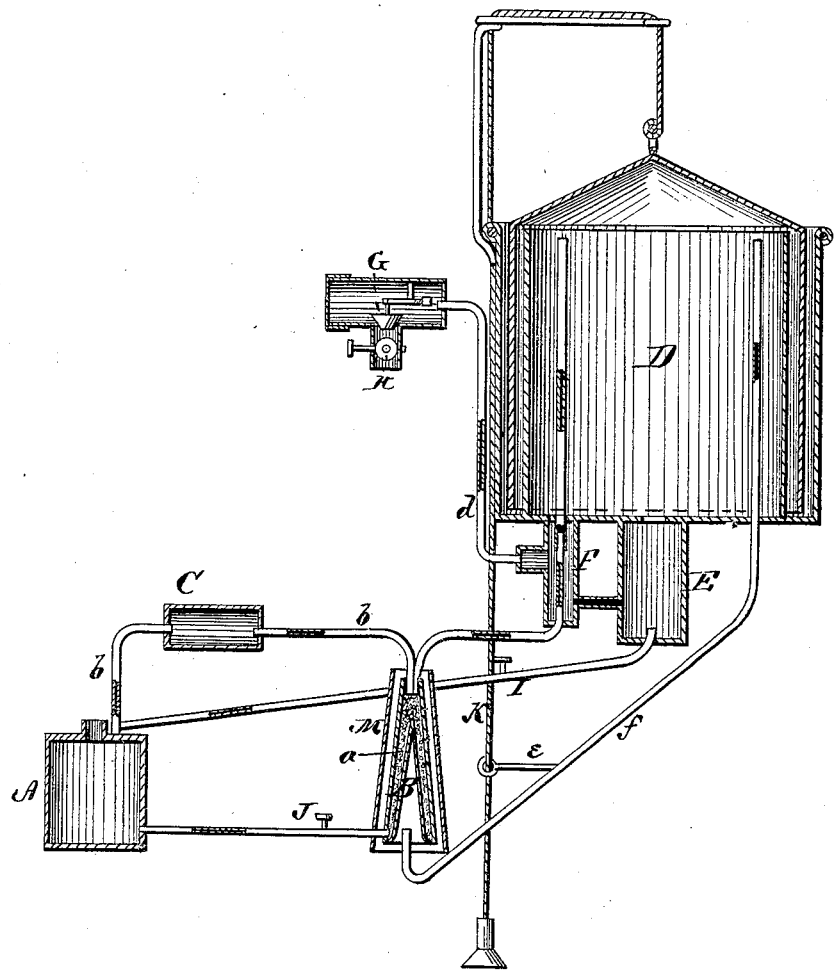
WITNESSES.
Franck L. Ourand
C. L. Evert
INVENTOR.
Alonzo C. Rand
Alexander Trustor
By
Attorneys.

UNITED STATES PATENT OFFICE.

ALONZO C. RAND, OF MINNEAPOLIS, MINNESOTA.

IMPROVEMENT IN GAS-MACHINES.

Specification forming part of Letters Patent No. 150,078, dated April 21, 1874; application filed February 18, 1874.

*To all whom it may concern:*

Be it known that I, ALONZO C. RAND, of Minneapolis, in the county of Hennepin and in the State of Minnesota, have invented certain new and useful Improvements in Gas-Machine; and do hereby declare that the following is a full, clear, and exact description thereof, reference being had to the accompanying drawings and to the letters of reference marked thereon, making a part of this specification.

My invention relates to that class of gas-machines in which illuminating-gas is manufactured from gasoline or other similar hydro-carbon liquid; and the nature of my invention consists in the construction of a double conical vaporizer provided with a fluid-absorbing substance and surrounded by a jacket, in combination with an injector-pipe and a pipe from the gas-holder; also, in combining in a gas-machine a fluid-tank, a pipe leading therefrom to a vaporizer filled with a fluid-absorbing substance, a gravitating gas-holder, and an air-injector. It also consists in connecting the supply-tank and vaporizer by pipes with an air-chamber, and in combining with the gas-holder an air-injector, air-pipe, balanced valve, and regulating-valve, all as more fully hereinafter set forth.

In order to enable others skilled in the art to which my invention appertains to make and use the same, I will now proceed to describe its construction and operation, referring to the annexed drawing, which represents a longitudinal vertical section of my machine.

A represents the tank for the gasoline or other material used for the manufacture of gas, which may be of any suitable dimensions, and located outside of the house in the ground, if required; or it may be in the house and surrounded with a cast-iron jacket to protect it from injury. B represents the vaporizer, constructed of two copper cones, one within the other, connected together at their lower ends, and the space between them filled with asbestus or other suitable fluid-absorbing substance, $a$, that will act by capillary attraction. C is an equalizer of pressure, and consists simply of an air-chamber connected, by pipes $b\ b$, with the retort or vaporizer B and the fluid-tank or reservoir A. Its object is to make the pressure equal upon the top of the liquid in the tank and vaporizer, thus permitting the capillaries to work. D represents the gas-holder, of ordinary construction, except that the seal is an annular space, instead of using the whole for water. E represents a tank attached to the bottom of the holder-tank D to receive the condensation, if any, from the holder. This is provided with a pipe and check-valve, I, leading to the tank A holding the material. F is the injector-pipe, which takes the gas from the retort or vaporizer B to the holder D, and induces a current of air to enter the cock H leading through a valve, G, and through a pipe, $d$, to the injector, the air being carried with the gas into the holder D. J is a stop-cock to shut off the supply of liquid from the tank A, when required. K is the connection with the holder counter-balance used to operate the burner L. M is a jacket around the vaporizer to retain the heat.

The operation of my machine is as follows: The tank A having been filled and the cock J opened, and the capillary substance $a$ having absorbed the liquid, heat is applied to the under or inner side of the vaporizer B. The vapor then passes into the injector-pipe and into the holder, carrying and mixing with the air induced by its current, the quantity of air being regulated by the cock H. The gas immediately flows through the pipe $f$ to the burner L, which is lighted, and supplies the necessary heat to the vaporizer. The pressure of vapor in the top of the vaporizer would, of course, drive the liquid out of the capillary tubes and back into the supply-tank were not the pressure-equalizer C supplied. This equalizer is simply a pipe connecting an air-chamber with the vaporizer and supply-tank. The advantage of this air-chamber over a simple pipe connecting the vaporizer with the supply-tank is, that if the vapor was permitted to pass into the supply-tank it would come in contact with the gasoline and become condensed; but, by the interposition of the air-chamber, a volume of air is driven into the tank A, thereby preventing the condensation of the vapor. Any condensation occurring in the gas-holder will run into the tank A from the tank E through the check-valve I. When the holder has been filled to its proper height, the crank $e$, connected with the heat-supply or burner L, is operated by the holder counter-balance connection K and the burner closed, leaving only sufficient gas escaping to make a tiny jet. This jet is always burning, its supply of gas coming from the holder. As the holder gravitates to the minimum height the burner is opened by the same crank that closed it, and the heat from the large flame produces more vapor, and the operation thus continues as long as any material remains in the storage-tank A.

The valve G is a balance-valve, the end of the lever being provided with an adjustable counter-balance.

The vaporizer B must always have a greater altitude than the tank A, so that the fluid may be fed into the vaporizer by capillary attraction.

Having thus fully described my invention, what I claim as new, and desire to secure by Letters Patent, is—

1. The vaporizer B, constructed of two cones, one within the other, connected at their lower ends, the space between them filled with a suitable fluid-absorbing substance, $a$, and surrounded by the jacket M, in combination with the injector-pipe F and gas-pipe $f$ from the holder D, substantially as and for the purposes herein set forth.

2. The combination, in a gas-machine, of the vaporizer B, constructed of two cones, filled with fluid-absorbing substance $a$, the fluid-tank A, pipe J, leading to the bottom of the vaporizer, and an air-injector opening in the top of the vaporizer and into a gravitating gas-holder, all substantially as and for the purposes herein set forth.

3. The air-chamber C and its connecting-pipes $b$ $b$, connecting the vaporizer and supply-tank, for the purpose set forth.

4. The combination, with the gas-holder D, of the air-injector F, pipe $d$, balance-valve G, and regulating-valve H, substantially as and for the purposes herein set forth.

In testimony that I claim the foregoing, I have hereunto set my hand this 13th day of February, 1874.

ALONZO C. RAND.

Witnesses:
 ROBT. MCMULLEN,
 H. W. BROWN.